(12) United States Patent
Han

(10) Patent No.: US 11,242,056 B2
(45) Date of Patent: Feb. 8, 2022

(54) APPARATUS AND METHOD FOR CONTROLLING SMART CRUISE CONTROL SYSTEM

(71) Applicant: MANDO CORPORATION, Pyeongtaek-si (KR)

(72) Inventor: Jae Hyun Han, Seoul (KR)

(73) Assignee: Mando Corporation, Pyeongtaek-si (KR)

( * ) Notice: Subject to any disclaimer, the term of this patent is extended or adjusted under 35 U.S.C. 154(b) by 216 days.

(21) Appl. No.: 16/267,684

(22) Filed: Feb. 5, 2019

(65) Prior Publication Data

US 2019/0241183 A1    Aug. 8, 2019

(30) Foreign Application Priority Data

Feb. 5, 2018    (KR) .......................... 10-2018-0013900

(51) Int. Cl.
*B60W 30/165*    (2020.01)
*B60W 30/02*    (2012.01)
(Continued)

(52) U.S. Cl.
CPC ........ *B60W 30/165* (2013.01); *B60W 30/025* (2013.01); *B60W 30/09* (2013.01);
(Continued)

(58) Field of Classification Search
CPC .... B60W 30/16; B60W 30/165; B60W 40/06; G06K 9/00798
See application file for complete search history.

(56) References Cited

U.S. PATENT DOCUMENTS 10,279,806 B2 *   5/2019  Oh .................. G05D 1/0238
2012/0056773 A1 *  3/2012  Sato ................. G01S 13/584
                                            342/109
(Continued)

FOREIGN PATENT DOCUMENTS

CN    106114511 A  * 11/2016  ............ B60W 50/00
CN    106114511 A  * 11/2016
(Continued)

OTHER PUBLICATIONS

Office Action issued in corresponding Korean Application No. 10-2018-0013900, dated Jun. 7, 2019.
(Continued)

*Primary Examiner* — Peter D Nolan
*Assistant Examiner* — Kenneth M Dunne
(74) *Attorney, Agent, or Firm* — Morgan, Lewis & Bockius LLP

(57) ABSTRACT

The present disclosure relates to a control apparatus and a control method of an adaptive cruise control system. The control apparatus of the adaptive cruise control system includes: an information collector configured to collect at least one of driving information about a host vehicle, information about an object positioned ahead of the host vehicle, and information about a road on which the host vehicle runs; a target selector configured to select a target vehicle based on the information about the object and to select a first driving route of the host vehicle based on the information about the road; a route corrector configured to generate a second driving route obtained by correcting the first driving route based on road structure information among the information about the road; an offset determinator configured to determine a lateral offset based on the second driving route and object information about the target vehicle; a target corrector configured to select the target vehicle as an ulti-
(Continued)

mate target vehicle based on the lateral offset; and a signal outputter configured to output a control signal to avoid the ultimate target vehicle while the host vehicle runs on the second driving route.

12 Claims, 8 Drawing Sheets

(51) Int. Cl.
 *B60W 30/09* (2012.01)
 *B60W 30/095* (2012.01)
 *B60W 40/06* (2012.01)
 *B60K 31/00* (2006.01)
 *G06K 9/00* (2006.01)

(52) U.S. Cl.
 CPC .... *B60W 30/0953* (2013.01); *B60W 30/0956* (2013.01); *B60W 40/06* (2013.01); *G06K 9/00798* (2013.01); *B60K 2031/0016* (2013.01); *B60K 2031/0025* (2013.01); *B60W 2420/52* (2013.01); *B60W 2552/00* (2020.02); *B60W 2552/30* (2020.02); *B60W 2554/00* (2020.02); *B60W 2554/801* (2020.02); *B60W 2554/803* (2020.02); *B60W 2554/804* (2020.02)

(56) References Cited

U.S. PATENT DOCUMENTS

| | | | |
|---|---|---|---|
| 2013/0179379 A1 | 7/2013 | Kurumisawa et al. | |
| 2014/0379247 A1* | 12/2014 | Ferguson | B60W 30/16 |
| | | | 701/301 |
| 2016/0159353 A1* | 6/2016 | Yun | B60W 10/184 |
| | | | 701/93 |
| 2017/0066444 A1* | 3/2017 | Habu | B60W 30/12 |
| 2017/0080940 A1* | 3/2017 | Ito | B60W 10/18 |
| 2018/0022351 A1* | 1/2018 | Habu | B60W 40/04 |
| | | | 701/96 |
| 2018/0086342 A1* | 3/2018 | Ohsugi | B60W 30/10 |
| 2018/0257647 A1* | 9/2018 | Jurca | B60W 30/0956 |
| 2019/0092330 A1* | 3/2019 | Ide | G01S 13/726 |
| 2019/0241184 A1* | 8/2019 | Hayashi | G05D 1/0223 |
| 2020/0047772 A1* | 2/2020 | Yasue | B60W 10/20 |
| 2020/0249684 A1* | 8/2020 | Onofrio | G05D 1/0088 |
| 2020/0324765 A1* | 10/2020 | Lanfranco | B60W 30/16 |
| 2020/0377088 A1* | 12/2020 | Fukushige | G01C 21/3658 |

FOREIGN PATENT DOCUMENTS

| | | | | |
|---|---|---|---|---|
| CN | 106828186 A | | 6/2017 | |
| EP | 2390745 | * | 11/2011 | ............... G05D 1/02 |
| JP | 8-329398 A | | 12/1996 | |
| JP | 2013-142975 A | | 7/2013 | |
| KR | 10-2014-0074105 A | | 6/2014 | |

OTHER PUBLICATIONS

European Search Report issued in European Patent Application No. 19155154.8 dated Sep. 24, 2019.
Office Action issued in corresponding Chinese Patent Application No. 201910110139.4, dated Nov. 3, 2021.

* cited by examiner

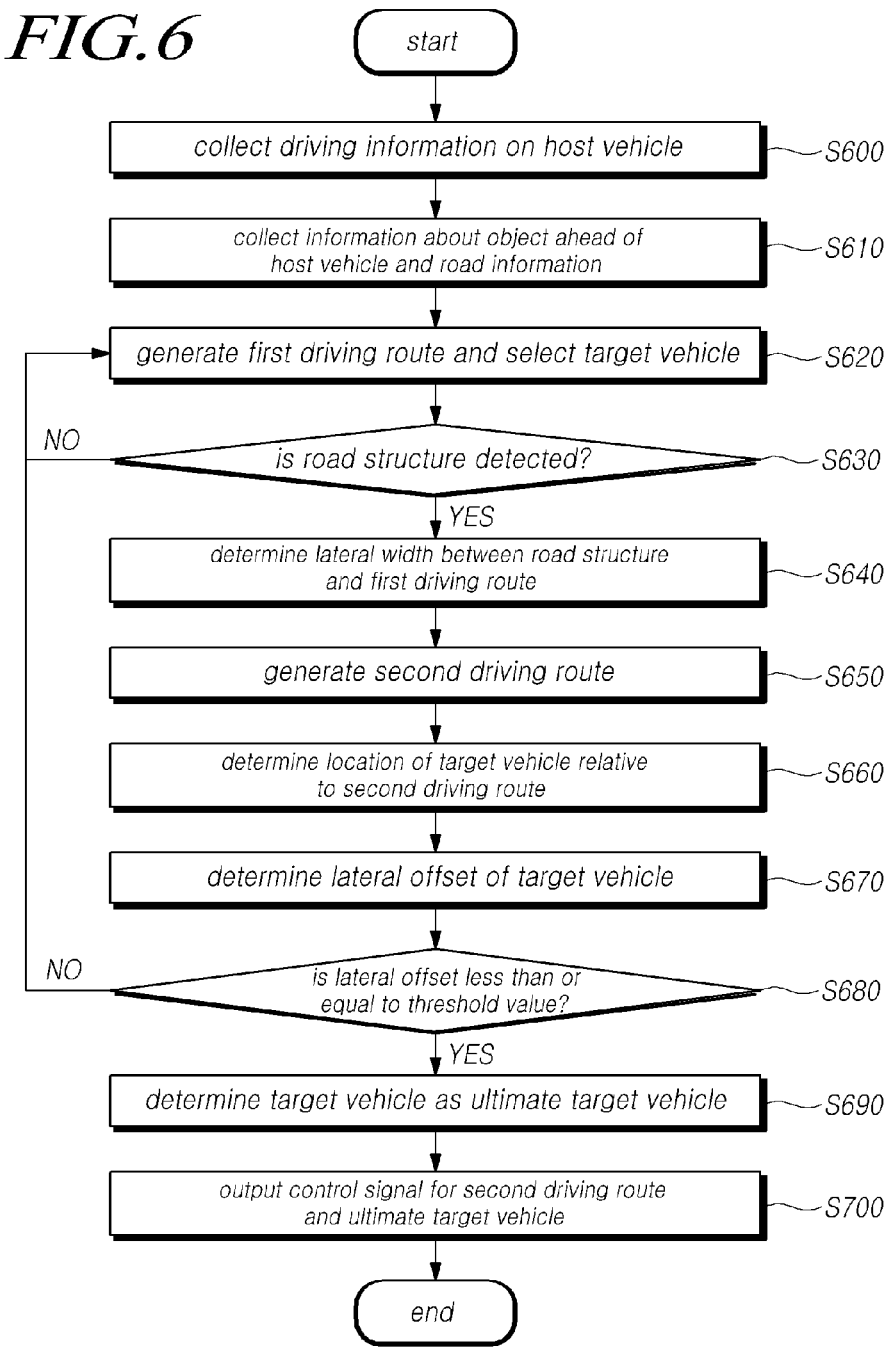

APPARATUS AND METHOD FOR CONTROLLING SMART CRUISE CONTROL SYSTEM

CROSS REFERENCE TO RELATED APPLICATION

This application claims priority from Korean Patent Application No. 10-2018-0013900, filed on Feb. 5, 2018, which is hereby incorporated by reference for all purposes as if fully set forth herein.

BACKGROUND OF THE INVENTION

1. Field of the Invention

The present disclosure relates to an apparatus and a method for controlling an adaptive cruise control system that control speed to prevent a front crash when a host vehicle runs on a curved road.

2. Description of the Prior Art

Generally, a Smart Cruise Control (SCC, or Adaptive Cruise Control (ACC)) system of a host vehicle refers to a system that detects other running vehicles, objects, and environments around the host vehicle by using a radar, which is a front detection sensor, and performs deceleration and acceleration control of the host vehicle according to a target speed so that the host vehicle keeps an appropriate distance from another vehicle running ahead of the host vehicle.

However, when the host vehicle runs on a curved road, centrifugal force acts strongly on the host vehicle, and thus the direction in which the host vehicle is actually traveling may point outside the circle rather than the direction in which the host vehicle body is pointing. Here, the difference in angle between the direction in which the host vehicle body is pointing and the direction in which the host vehicle is actually traveling is referred to as a body sideslip angle.

The actual driving route of the host vehicle may be different from a driving route estimated by the SCC system due to the occurrence of an error by the sideslip angle. A conventional SCC system determines that there is no other vehicle existing in an actual driving route and thus have the problem of excluding any other vehicle as a target object.

In order to solve this problem, research and development are necessary on SCC systems that quickly and accurately process an operation for target selection to provide vehicle running stability for a driver.

SUMMARY OF THE INVENTION

In order to solve the above-described problem, the present disclosure provides an apparatus and a method for controlling a smart cruise control system capable of quickly and accurately selecting a target vehicle.

The present disclosure also provides an apparatus and a method for controlling a smart cruise control system to minimize unnecessary braking and acceleration operations.

Accordingly, the present disclosure may provide a vehicle control system including: at least one radar sensor mounted to a host vehicle to have a sensing area for an outside of the host vehicle; and a controller configured to follow an ultimate target vehicle in a driving route of the host vehicle at least partly based on the processed sensing data by the radar sensor, wherein the controller selects a target vehicle based on object information obtained from a result of processing the sensing data, generates a first driving route of the host vehicle based on road information about a road on which the host vehicle runs, obtained from the result of processing the sensing data, generates a second driving route obtained by correcting the first driving route based on road structure information included in the road information, determines a lateral offset based on the selected target vehicle and the second driving route, and selects the target vehicle as the ultimate target vehicle based on the lateral offset.

The present disclosure may also provide a control apparatus of an adaptive cruise control system including: an information collector configured to collect at least one of driving information about a host vehicle, information about an object positioned ahead of the host vehicle, and information about a road on which the host vehicle runs; a target selector configured to select a target vehicle based on the information about the object and to select a first driving route of the host vehicle based on the information about the road; a route corrector configured to generate a second driving route obtained by correcting the first driving route based on road structure information among the information about the road; an offset determinator configured to determine a lateral offset based on the second driving route and object information about the target vehicle; a target corrector configured to select the target vehicle as an ultimate target vehicle based on the lateral offset; and a signal outputter configured to output a control signal to avoid the ultimate target vehicle while the host vehicle runs on the second driving route.

Further, the present disclosure may provide a method for controlling an adaptive cruise control system, the method including: an information collection operation of collecting at least one of driving information about a host vehicle, information about an object positioned ahead of the host vehicle, and information about a road on which the host vehicle runs; a target selection operation of selecting a target vehicle based on the information about the object and selecting a first driving route of the host vehicle based on the information about the road; a route correction operation of generating a second driving route obtained by correcting the first driving route based on road structure information among the information about the road; an offset determination operation of determining a lateral offset based on the second driving route and object information about the target vehicle; a target correction operation of selecting the target vehicle as an ultimate target vehicle based on the lateral offset; and a signal output operation of outputting a control signal to avoid the ultimate target vehicle while the host vehicle runs on the second driving route.

Other specific details of the present disclosure are included in the detailed description and the drawings.

As described above, according to the present disclosure, it is possible to quickly process an operation during high-speed driving, thereby providing stability and convenience in driving for a driver.

Further, it is possible to minimize unnecessary braking and acceleration operations, thus reducing a feeling of discontinuity in driving.

BRIEF DESCRIPTION OF THE DRAWINGS

The above and other aspects, features and advantages of the present disclosure will be more apparent from the following detailed description taken in conjunction with the accompanying drawings, in which:

FIG. 6 is a flowchart illustrating a method for controlling an adaptive cruise control system in detail according to an embodiment of the present disclosure.

DETAILED DESCRIPTION OF THE EXEMPLARY EMBODIMENTS

Figure 1:
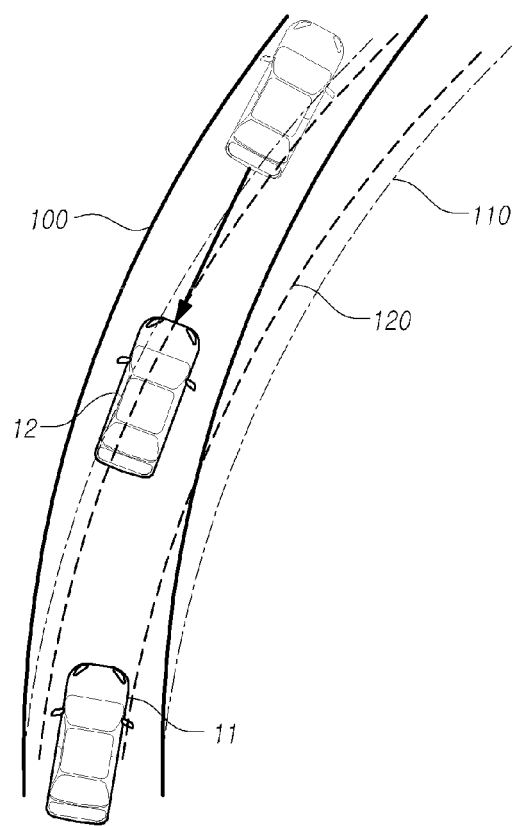
FIG. 1 illustrates an example of a method for controlling an adaptive cruise control system according to the present disclosure.

Hereinafter, exemplary embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Hereinafter, the present disclosure will be described in detail with reference to the accompanying drawings.

FIG. 1 illustrates an example of a method for controlling an adaptive cruise control system according to the present disclosure.

As illustrated in FIG. 1, a Smart Cruise Control (SCC) system of the present disclosure may estimate an estimated driving route 110 using the radius of curvature of a driving road when a host vehicle 11 runs on a curved road, and may check whether another vehicle 12' running near the host vehicle 11 exists in the estimated driving route 110 and an estimated travelling area 120 of the host vehicle 11.

However, when the host vehicle 11 runs on a curved road, centrifugal force acts strongly on the host vehicle 11, and thus the direction in which the host vehicle 11 is actually traveling may point outside the circle rather than the direction in which the host vehicle body is pointing. Here, the difference in angle between the direction in which the host vehicle body is pointing and the direction in which the host vehicle 11 is actually traveling is referred to as a body sideslip angle.

The actual driving route 100 of the host vehicle 11 may be different from the estimated driving route 110 due to the occurrence of an error by the sideslip angle.

Accordingly, the SSC system of the present disclosure receives the relative position values of the host vehicle 11 with respect to a longitudinal direction and a lateral direction based on a radar signal, determines a lateral offset between the actual driving route 100 of the host vehicle 11 and the estimated driving route 110, and generates a corrected driving route 120 corrected by applying the lateral offset to the estimated driving route 110, thereby selecting the other vehicle 12' as a target located on the corrected driving route 120.

In high-speed running, since the operation processing speed, at which the SSC system of the present disclosure estimates the corrected driving route 120 and selects the target, cannot follow the speed of the host vehicle 11, the SCC system may select the other vehicle 12, which has already been close to the host vehicle 11, as a target.

Therefore, a vehicle control system including an SCC system according to an embodiment of the present disclosure that quickly and accurately processes an operation for target selection will be described hereinafter.

Figure 2A:
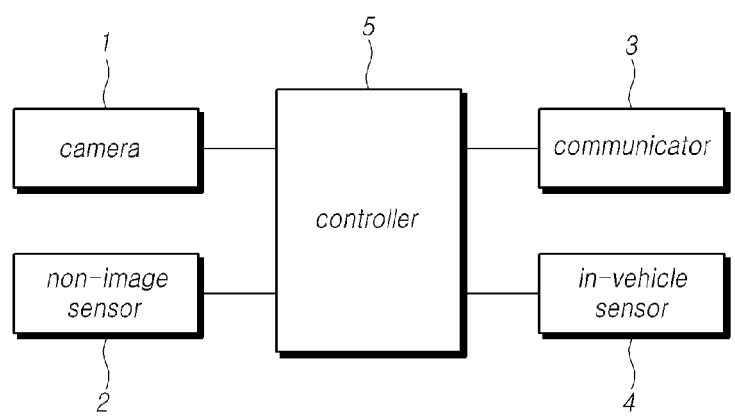
FIG. 2A illustrates the configuration of a vehicle control system according to an embodiment of the present disclosure.

FIG. 2A illustrates the configuration of a vehicle control system according to an embodiment of the present disclosure. Referring to FIG. 2A, the host vehicle control system according to the embodiment of the present disclosure may include a first sensor 1, a second sensor 2, a communicator 3, an in-vehicle sensor 4, and a controller 5.

The first sensor 1 includes, for example, a camera and a LiDAR sensor.

For example, the first sensor 1 may include an image sensor configured to have a view of an inside or outside of the host vehicle 11 and to capture image data and a processor to process the captured image data.

For example, the image sensor may be mounted to the host vehicle 11 to have a view of an inside or outside of the host vehicle 11. At least one image sensor may be mounted on each part of the host vehicle 11 to have a view of the front, a lateral side, or the rear of the host vehicle 11.

Image information captured by the image sensor includes image data and thus may be referred to as "image data captured by the image sensor". Hereinafter, in the present disclosure, image information captured by the image sensor is referred to as "image data captured by the image sensor". The image data captured by the image sensor may be generated, for example, in one raw format of AVI, MPEG-4, H.264, DivX, and JPEG.

The image data captured by the image sensor may be processed by the processor. The processor may operate to process the image data captured by the image sensor.

The processor may be configured in hardware, using at least one of electronic units capable of processing image data and performing other functions, such as Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, micro-controllers, and microprocessors.

The second sensor 2 refers to any sensor other than the first sensor 1 that captures an image. For example, a plurality of second sensors 2 may be mounted to the host vehicle 11 to have a sensing area for the inside or outside of the host vehicle 11 and may capture sensing data. The plurality of second sensors 2 includes, for example, a radar sensor, and an ultrasonic sensor. No second sensor 2 may be provided, or one or more second sensors 2 may be provided.

The communicator 3 functions to perform communication between vehicles, communication between a vehicle and the infrastructure, communication between a vehicle and a server, and in-vehicle communication. To this end, the communicator 3 may include a transmitter and a receiver. For example, the communicator 3 may include a broadcast receiver, a wireless Internet module, a short-range communicator, a location information module, an optical communicator, and a V2X communicator.

The broadcast receiver receives a broadcast signal or broadcast-related information from an external broadcast management server through a broadcast channel. Here, a broadcast includes at least one of a radio broadcast and a TV broadcast. The wireless Internet module refers to a module for wireless Internet access and may be internally or externally mounted in a vehicle. The short-range communicator is for short-range communication and may support short-range communication using at least one of Bluetooth™, Radio-Frequency Identification (RFID), Infrared Data Association (IrDA), Ultra-Wideband (UWB), ZigBee, Near-Field Communication (NFC), Wireless-Fidelity (Wi-Fi), Wi-Fi Direct, or Wireless Universal Serial Bus (USB) technologies.

The location information module is a module for acquiring location information about the host vehicle 11, and a representative example thereof is a Global Positioning System (GPS). For example, when the host vehicle 11 utilizes the GPS, the host vehicle 11 can acquire the location of the host vehicle 11 using a signal transmitted from a GPS satellite. Depending on embodiments, the location information module may be a component included in the in-vehicle sensor 4 rather than a component included in the communicator 3.

The optical communicator may include a light emitter and a light receiver. The light emitter and the light receiver may convert a light signal into an electric signal to transmit and receive information.

The V2X communicator is a module for performing wireless communication with a server, another vehicle, or an infrastructure device. The V2X communicator in the present embodiment refers to an operation or a technique in which a vehicle exchanges information with an object, such as another vehicle, a mobile device, and a road, through wired and wireless networks. The V2X communicator may include Vehicle-to-Vehicle (V2V) communication, Vehicle-to-Infrastructure (V2I) communication, Vehicle-to-Nomadic Device (V2N) communication, Vehicle-to-Pedestrian (V2P) communication), and the like. The V2X communicator is based on Dedicated Short-Range Communications (DSRC) and may employ the IEEE 802.11p communication technology using Wireless Access in Vehicle Environments (WAVE), which has recently been established by the US Institute of Electrical and Electronics Engineers (IEEE), or a 5.9 GHz band but is not limited thereto. The V2X communicator should be understood as including communication between any vehicles that is currently developed or will be developed in the future.

The in-vehicle sensor 4 refers to a sensor to sense in-vehicle information. For example, the in-vehicle sensor 4 may include a torque sensor to sense steering torque, a steering angle sensor to sense a steering angle, a motor position sensor to sense information about a steering motor, a vehicle speed sensor, a vehicle motion detection sensor to sense a movement of the host vehicle 11, and a vehicle position detection sensor. In addition, the in-vehicle sensor 4 may be a sensor to sense various data about the inside of the host vehicle 11 and may include one or more sensors.

The controller 5 acquires data from at least one of the first sensor 1, the second sensor 2, the communicator 3 and the in-vehicle sensor 4 and may control various operations of the host vehicle 11 based on the acquired data. Also, the controller 5 may acquire image data from the first sensor 1 and may process the image data. In addition, the controller 5 may receive sensing data from the second sensor 2 and may process the sensing data. Further, the controller 5 may acquire data from the in-vehicle sensor 4 or the communicator 3 and may process the data. For this processing, the controller 5 may include at least one processor.

A vehicle control system according to the present disclosure may be configured by combining the foregoing components as necessary. For example, the vehicle control system includes the first sensor 1, the second sensor 2, and the controller 5. In another example, the vehicle control system includes the first sensor 1 and the controller 5. In still another example, the vehicle control system includes the second sensor 2 and the controller 5. However, the vehicle control system is not limited to the above examples.

Specifically, the vehicle control system may include: at least one second sensor 2 mounted to the host vehicle 11 to have a sensing area for the inside or outside of the host vehicle 11 and configured to capture sensing data and to process the captured sensing data; and the controller 5 configured to follow an ultimate target vehicle in the driving route of the host vehicle 11 at least partly based on the processed sensing data.

The controller 5 may select a target vehicle based on object information obtained from the result of processing the sensing data, may generate a first driving route of the host vehicle 11 based on road information about a road on which the host vehicle 11 runs, obtained from the result of processing the sensing data, may generate a second driving route obtained by correcting the first driving route based on road structure information included in the road information, may determine a lateral offset based on the selected target vehicle and the second driving route, and may select the target vehicle as an ultimate target vehicle based on the lateral offset.

The first driving route may be an estimated driving route of the host vehicle 11 generated based on the road information, such as the curvature of the road and a lane position.

The controller 5 may output a control signal to control the traveling speed of the host vehicle 11 so that the host vehicle 11 follows the ultimate target vehicle and keeps a constant distance from the ultimate target vehicle while running on the second driving route.

The controller 5 may select, as the target vehicle, an object within the first driving route from among objects located ahead of the host vehicle 11.

If a road structure is detected, the controller 5 may determine the lateral width between the road structure and the first driving route, thereby generating the second driving route.

Here, the controller 5 may generate the second driving route by adding a width route with respect to the lateral width and the first driving route.

The controller 5 may determine the lateral offset by determining relative location information about the target vehicle based on the second driving route.

If the lateral offset is less than or equal to a threshold value, the controller 5 may select the target vehicle as the ultimate target vehicle. If the lateral offset exceeds the threshold value, the controller 5 may not select the target vehicle.

The road information may include at least one of lane information, curvature information, and road structure information, and the object information may include at least one of location information, speed information, and appearance information about an object.

The specific operation of the controller 5 will be described later. The controller 5 may control the operation of at least one of the first sensor 1, the second sensor 2, the communicator 3, and the in-vehicle sensor 4. Further, the controller 5 may control the operation of various driver-assistance systems configured in the host vehicle 11.

On the other hand, a Domain Control Unit (DCU) may be configured to perform all of the foregoing function of the processor, the operation of the controller 5, and the function of controlling the host vehicle 11 through output to a steering controller, a braking controller, and an Adaptive Driving Assistance System (ADAS).

The ADAS may be a module configured with a plurality of driver-assistance systems. The driver-assistance systems may include, for example, a Smart Parking Assistance System (SPAS), a Blind Spot Detection (BSD) system, an Adaptive Cruise Control (ACC) system, a Lane Departure Warning System (LDWS), a Lane-Keeping Assist System (LKAS), and a Lane Change Assist System (LCAS) but are not limited thereto.

Figure 2B:
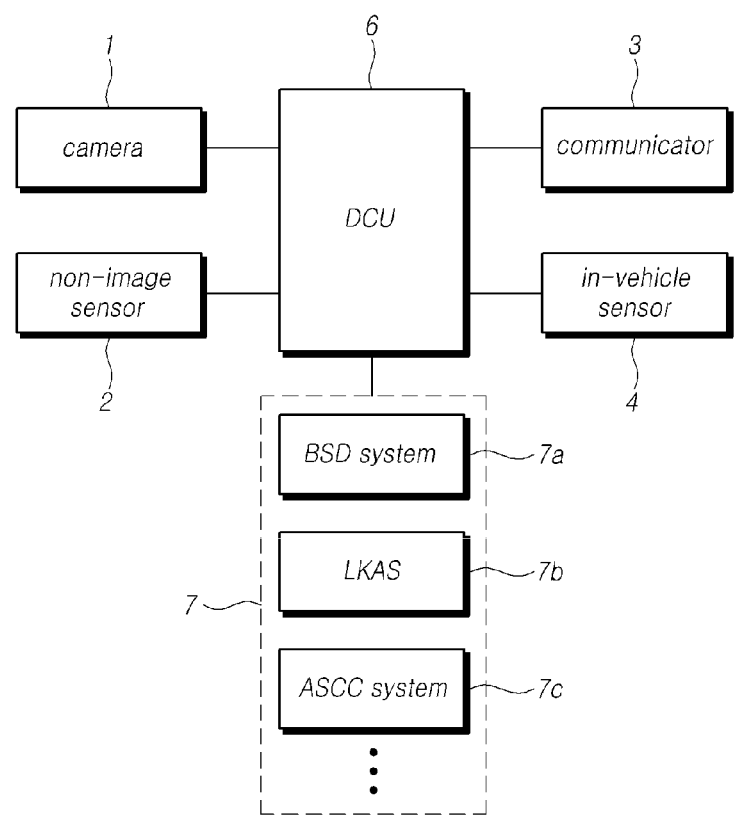
FIG. 2B illustrates the configuration of a vehicle control system according to another embodiment of the present disclosure.

FIG. 2B illustrates the configuration of a vehicle control system according to another embodiment of the present disclosure.

Referring to FIG. 2B, the vehicle control system according to the other embodiment of the present disclosure may include at least one of the first sensor 1, the second sensor 2, the communicator 3, and the in-vehicle sensor 4. A description of these components has been made with reference to FIG. 1 and thus will be omitted herein.

In addition, the vehicle control system may include a Domain Control Unit (DCU) 6.

The DCU 6 may be configured to receive image data captured by at least one image sensor, to receive sensing data captured by a plurality of second sensors 2, and to process at least one of the image data and the sensing data. For this processing, the DCU 6 may include at least one processor.

Alternatively, the DCU 6 may transmit and receive data to and from at least one of the first sensor 1, the second sensor 2, the communicator 3, the in-vehicle sensor 4, and a driver-assistance system 7 and may process data received therethrough. That is, the DCU 6 may be provided in the host vehicle 11 and may communicate with at least one device mounted in the host vehicle 11. To this end, the DCU 6 may further include a suitable data link or communication link, such as a vehicle network bus, for data transmission or signal communication.

The DCU 6 may operate to control one or more of a plurality of driver-assistance systems (DAS) used in the host vehicle 11. For example, the DCU 6 may determine whether a particular situation, a condition, or an event occurs, whether to perform a control operation, or the like based on data obtained from at least one of the foregoing components 1, 2, 3, 4, and 7.

The DCU 6 may transmit a signal to control the operation of the various driver-assistance systems 7 configured in the host vehicle 11 using determined information. For example, the driver-assistance systems 7 may include a BSD system 7a, a LKAS 7b, and an Adaptive Smart Cruise Control (ASCC) system 7c.

In addition, the driver-assistance systems 7 configured in the host vehicle 11 may include various systems, such as a LDWS, a LCAS, and a SPAS. The terms and names for the driver-assistance systems described herein are illustratively disclosed and are not intended to limit these systems. In addition, the driver-assistance systems 7 may include an autonomous driving system for autonomous driving. Alternatively, the DCU may control the host vehicle 11 to perform autonomous driving through the control of the individual systems included in the driver-assistance system 7.

As described above, the vehicle control system according to the present disclosure may be configured by combining the foregoing components as necessary. For example, the vehicle control system includes: at least one second sensor 2 mounted to the host vehicle 11 to have a sensing area for the inside or outside of the host vehicle 11 and configured to capture sensing data; a driver-assistant system 7 to control the vehicle speed of the host vehicle 11 so that the host vehicle 11 runs at a target speed while maintaining a constant distance from a target; and a DCU 6 configured to process the captured sensing data and to control at least one driver-assistance system module provided in the host vehicle.

Here, the DCU 6 may select a target vehicle based on object information obtained from the result of processing the sensing data, may generate a first driving route of the host vehicle 11 based on road information about a road on which the host vehicle 11 runs, obtained from the result of processing the sensing data, may generate a second driving route obtained by correcting the first driving route based on road structure information included in the road information, may determine a lateral offset based on the selected target vehicle and the second driving route, and may select the target vehicle as an ultimate target vehicle based on the lateral offset.

The vehicle control system according to the present disclosure may include an adaptive cruise control system to implement the above-described operations but is not limited thereto. Hereinafter, an adaptive cruise control system included in a vehicle control system will be described.

Figure 2C:
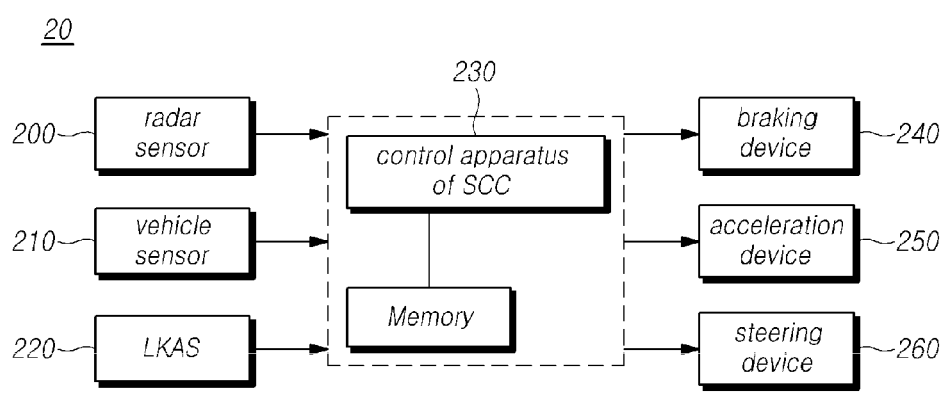
FIG. 2C illustrates the configuration of a control apparatus of an adaptive cruise control system according to the present disclosure.

FIG. 2C illustrates the configuration of an adaptive cruise control system according to the present disclosure.

Referring to FIG. 2C, a SCC system according to an embodiment of the present disclosure includes a radar sensor 200, a vehicle sensor 210, a LKAS 220, a control apparatus of SCC 230, a memory, a braking device 240, an acceleration device 250, and a steering device 260.

Specifically, the radar sensor 200 may detect object information by detecting the speed and distance of a target vehicle relative to the host vehicle 11 and may transmit the detected object information to the control apparatus 230 of SCC.

The vehicle sensor 210 may include a steering angle sensor to measure a steering angle, which is steering information about the host vehicle 11, a torque sensor to measure torque, a yaw rate sensor to measure a rotational angular speed indicating the degree of turning of the host vehicle 11, a vehicle speed sensor to measure a vehicle speed, which is speed information about the host vehicle 11, and a GPS to measure location information about the host vehicle 11. Here, driving information detected by the vehicle sensor 210 may be transmitted to the control apparatus 230 of SCC.

The vehicle sensor 210 may be included in the in-vehicle sensor 4 illustrated in FIGS. 1 and 2.

A driving support system, such as a LDWS and LKAS 220, may transmit information about a road on which the host vehicle 11 runs to the control apparatus 230 of SCC.

The control apparatus 230 of SCC according to the present disclosure may control, based on the received pieces of information, deceleration and acceleration of the host vehicle 11 to meet a target speed so that the host vehicle 11 keeps an appropriate distance from a preceding vehicle.

The memory may store driving information, object information, and road information and may store data obtained based on the pieces of information.

The memory may be a non-volatile memory device, such as a Read-Only Memory (ROM), a Random-Access Memory (RAM), a Programmable Read-Only Memory (PROM), an Erasable Programmable Read-Only Memory (EPROM), and a flash memory, or a storage medium, such as a hard disk and an optical disk.

The control apparatus 230 of SCC may transmit a control signal to the braking device 240 including a brake controller, the acceleration device 250 including an accelerator controller, and the steering device 260 including an electromotive power steering system in the host vehicle 11 to automatically control the driving route of the host vehicle 11, thereby preventing an accident.

Figure 3:
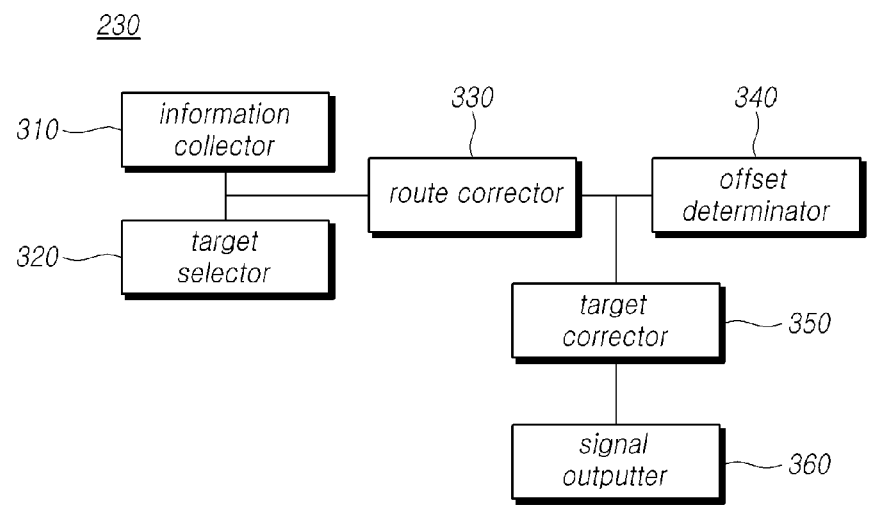
FIG. 3 is a block diagram illustrating a control apparatus of an adaptive cruise control system according to an embodiment of the present disclosure.

FIG. 3 is a block diagram illustrating a control apparatus of an adaptive cruise control system according to an embodiment of the present disclosure.

Referring to FIG. 3, the control apparatus 230 of the adaptive cruise control system 20 according to the embodiment of the present disclosure may include: an information collector 310 to collect at least one of driving information about the host vehicle 11, information about an object positioned ahead of the host vehicle 11, and information about a road on which the host vehicle 11 runs; a target selector 320 to select a target vehicle based on the information about the object and to select a first driving route of the host vehicle 11 based on the information about the road; a route corrector 330 to generate a second driving route obtained by correcting the first driving route based on road structure information included in the information about the road; an offset determinator 340 to determine a lateral offset based on the second driving route and object information about the target vehicle; a target corrector 350 to select the target vehicle as an ultimate target vehicle based on the lateral offset; and a signal outputter 360 to output a control signal to avoid the ultimate target vehicle while running on the second driving route.

The driving information may include at least one of steering information, speed information, and location information. That is, the information collector 310 may be provided in the host vehicle 11 to receive driving information from various sensors including a steering angle sensor, a torque sensor, a yaw rate sensor, a vehicle speed sensor, and a GPS.

The information about the road may include at least one of lane information, curvature information, and road structure information, and the information about the object may include at least one of location information, speed information, and appearance information about the object.

The information about the road and the information about the object may be detected by at least one of radar sensors provided at the front and a side of the host vehicle 11, a camera, an ultrasonic sensor, and an infrared sensor but is not limited thereto. In addition, the information about the road and the information about the object may be transmitted to the information collector 310 from various driving support systems provided in the host vehicle 11.

That is, the information collector 310 may include various sensors and various systems mounted on the host vehicle 11 or may receive information detected by the various sensors and driving support systems through a communication network in the host vehicle 11.

That is, the information collector 310 may include a wireless communication network including a mobile communication network, such as the Internet, an Integrated Service Digital Network (ISDN), an Asymmetric Digital Subscriber Line (ADSL), a Local Area Network (LAN), the Ethernet, a Controller Area Network (CAN), a TCP/IP-based communication network, an optical communication network, CDMA, and WCDMA, and a short-range communication network, such as ZigBee and Bluetooth™.

The target selector 320 may select an object in the first driving route as a target vehicle from among objects positioned in front of the host vehicle 11 based on object information collected by the information collector 310.

The first travelling route may be an estimated driving route of the host vehicle 11 generated based on the curvature of the road and the position of a lane as road information. The first driving route may be a driving route having a width narrower than the width of the actual driving route of the host vehicle 11 to accurately select a target vehicle.

When a road structure is detected based on the road information and the object information collected by the information collector 310, the route corrector 330 may determine the lateral width between the road structure and the first driving route and may generate the second driving route. For example, the road structure may include a guardrail, a road sign board, a streetlight, a street tree, and a chevron sign board.

Therefore, the route corrector 330 may generate the second driving route by adding a width route with respect to the lateral width and the first driving route.

That is, if the road structure is detected on the left side, the width of the second driving route may be $W_{L2}=W_{L1}+\Delta W_L$, where $W_{L1}$ is the width of the first driving route, and $\Delta W_L$ is the lateral width with respect to the road structure located on the left side.

If the road structure is detected on the right side, the width of the second driving route may be $W_{R2}=W_{R1}+\Delta W_R$, where $W_{R1}$ is the width of the first driving route, and $\Delta W_R$ is the lateral width with respect to the road structure located on the right side.

Therefore, the width of the second driving route may be larger than the width of the first driving route. That is, since the second driving route has a wider driving area than the first driving route, more targets can be selected.

The offset determinator 340 may determine relative location information about the target vehicle based on the second driving route generated by the route corrector 330, thereby determining a lateral offset.

The relative location information about the target vehicle may be determined based on location information, which is the object information.

If the lateral offset determined by the offset determinator 340 is less than or equal to a threshold value, the target corrector 350 may select the target vehicle as the ultimate target vehicle. If the lateral offset exceeds the threshold value, the target corrector 350 may not select the target vehicle.

The threshold value may be preset to a reference value determining that an object exists within the second driving route.

That is, if the lateral offset is less than or equal to the threshold value, it is determined that the target vehicle exists within the second travel route, and thus the target vehicle may be selected as the ultimate target vehicle.

The signal outputter 360 may transmit various control signals to control driving of the host vehicle 11 to the braking device 240, the acceleration device 250, and the steering device 260 based on the second driving route and the ultimate target vehicle received from the target corrector 350.

Accordingly, the host vehicle 11 can avoid the ultimate final target vehicle and can safely run, minimizing a feeling of discontinuity.

It is apparent that the controller 5 or the DCU 6 can perform the operation of each of the components of the control apparatus 230 described above.

Figure 4:
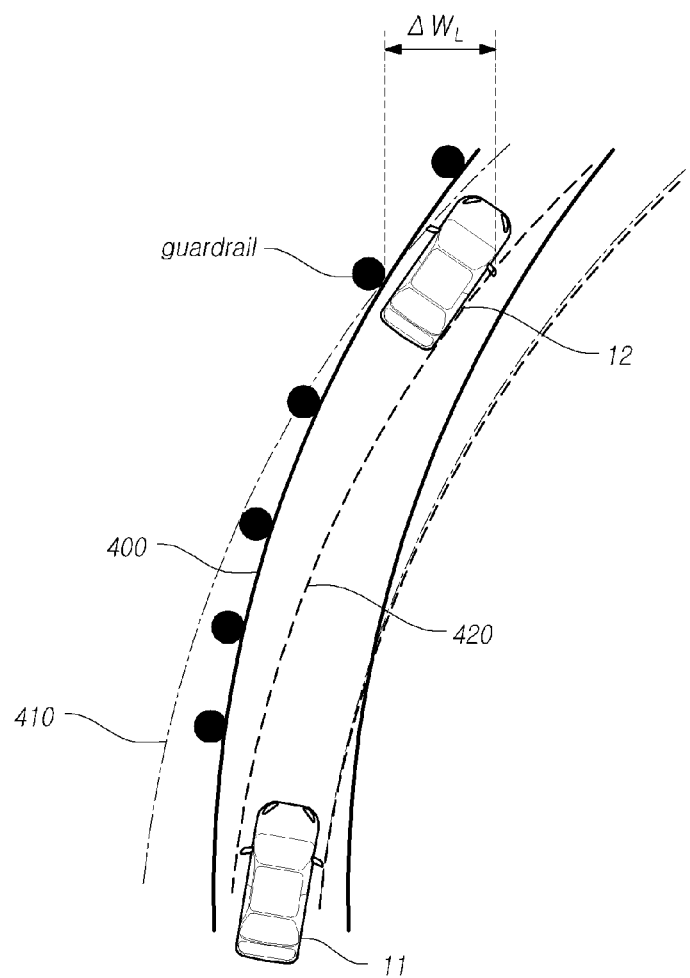
FIG. 4 illustrates an example of the operation of a control apparatus of an adaptive cruise control system according to an embodiment of the present disclosure.

FIG. 4 illustrates an example of the operation of a control apparatus of an adaptive cruise control system according to an embodiment of the present disclosure.

As illustrated in FIG. 4, a host vehicle 11 equipped with the control apparatus 230 of the adaptive cruise control system is running at a high speed on a curved road 400, and another preceding vehicle 12 is running on the curved road 400 on which the host vehicle 11 runs.

If a road structure is detected on one side of the curved road 400, the control apparatus 230 of the adaptive cruise control system measures the distance between the road structure and a generated first driving route 410, and generates a second driving route 420 by correcting the first driving route 410 if the measured distance is less than or equal to a preset threshold value.

Determining whether the measured distance is less than or equal to the threshold value is performed because, if the road structure is located very far from the host vehicle 11, the host vehicle 11 runs very unstably in the lateral direction, and thus the control apparatus 230 cannot accurately perform control.

Specifically, it is assumed that, with the first driving route 410 generated and a target vehicle not yet selected, a guardrail, which is a road structure, is detected on the left side of the curved road 400 by the control apparatus 230 of the adaptive cruise control system. The control apparatus 230 determines the lateral width ($\Delta W_L$) between the position of the guardrail and the first driving route 410, thereby generating a second driving route 420. The width of the second driving route 420 may be $W_{L2}=W_{L1}+\Delta W_L$, and the second driving route 420 may be generated by combining a width route relating to the lateral width ($\Delta W_L$) and the first driving route 410.

Therefore, since the other vehicle 12 does not exist within the generated first driving route 410 but exists within the second driving route 420 obtained by correcting the first driving route 410, the other vehicle 12 may be selected as an ultimate target vehicle.

Accordingly, the present disclosure provides a control apparatus and a control method of an adaptive cruise control system which are capable of quickly and accurately selecting a target vehicle and provides an apparatus and a method for controlling an adaptive cruise control system to minimize unnecessary braking and acceleration operations.

Figure 5:
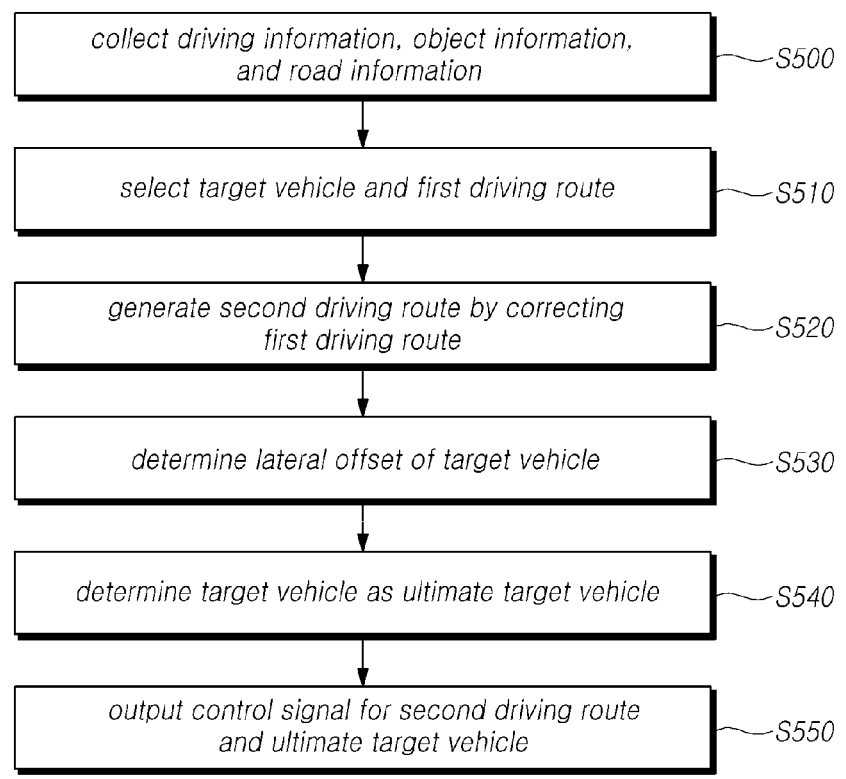
FIG. 5 is a flowchart illustrating a method for controlling an adaptive cruise control system according to an embodiment of the present disclosure.

FIG. 5 is a flowchart illustrating a method for controlling an adaptive cruise control system according to an embodiment of the present disclosure.

Referring to FIG. 5, the method for controlling the adaptive cruise control system according to the embodiment of the present disclosure may include: an information collection operation (S500) of collecting at least one of driving information about the vehicle 11, information about an object positioned ahead of the host vehicle 11, and information about a road on which the host vehicle 11 runs; a target selection operation (S510) of selecting a target vehicle based on the information about the object and selecting a first driving route of the host vehicle 11 based on the information about the road; a route correction operation (S520) of generating a second driving route obtained by correcting the first driving route based on road structure information included in the information about the road; an offset determination operation (S530) of determining a lateral offset based on the second driving route and object information about the target vehicle; a target correction operation (S540) of selecting the target vehicle as an ultimate target vehicle based on the lateral offset; and a signal output operation (S550) of outputting a control signal to avoid the ultimate target vehicle while running on the second driving route.

FIG. 6 is a flowchart illustrating a method for controlling an adaptive cruise control system in detail according to an embodiment of the present disclosure.

Referring to FIG. 6, driving information about a host vehicle 11 is collected (S600).

The driving information may include at least one of steering information, speed information, and location information. That is, the information collector 310 may be provided in the host vehicle 11 to receive driving information from various sensors including a steering angle sensor, a torque sensor, a yaw rate sensor, a vehicle speed sensor, and a GPS.

Information about an object positioned ahead of the host vehicle 11 and information about a road on which the host vehicle 11 runs are collected (S610).

The information about the road may include at least one of lane information, curvature information, and road structure information, and the information about the object may include at least one of location information, speed information, and appearance information about the object.

A first driving route is generated, and an object within the first driving route is selected as a target vehicle (S620).

It is determined whether a road structure is detected through the information about the road and the information about the object (S630).

If a road structure is not detected, the generated first driving route is maintained, and the selected target vehicle is maintained (S620).

If a road structure is detected, the lateral width between the road structure and the first driving route is determined (S640).

A second driving route is generated based on the first driving route and the lateral width (S650).

That is, the second driving route may be generated by combining a width route with respect to the lateral width and the first driving route.

The location of the target vehicle relative to the second driving route is determined (S660).

A lateral offset is determined based on the relative location of the target vehicle (S670).

The relative location information may be determined based on location information, which is the information about the object.

Next, it is determined whether the lateral offset is less than or equal to a threshold value (S680).

The threshold value may be preset to a reference value determining that an object exists in the second driving route.

If the lateral offset exceeds the threshold value, the target vehicle is not selected, the first driving route is regenerated, and a target vehicle is reselected (S620).

If the lateral offset is less than or equal to the threshold value, the target vehicle is selected as an ultimate target vehicle (S690).

That is, if the lateral offset is less than or equal to the threshold value, it is determined that the target vehicle exists within the second travel route, and thus the target vehicle may be selected as the ultimate target vehicle.

The host vehicle 11 travels along the second driving route and outputs a control signal to avoid the ultimate target vehicle (S700).

Accordingly, the host vehicle 11 can avoid the ultimate final target vehicle and can safely run, minimizing a feeling of discontinuity.

As described above, an apparatus and a method for controlling an adaptive cruise control system according to the present disclosure can quickly process an operation during high-speed driving to provide stability and convenience in driving for a driver and can minimize unnecessary braking and acceleration operations to reduce a feeling of discontinuity in driving.

In addition, an electromotive power steering control apparatus and an electromotive power steering control method according to the present disclosure can be applied to any driving support system including a system for preventing a host vehicle collision.

Although all the elements constituting embodiments of the present disclosure have been described above as being combined into a single unit or combined to be operated as a single unit, the present disclosure is not necessarily limited to these embodiments. That is, at least two elements of all structural elements may be selectively joined and operate without departing from the scope of the present disclosure.

The above embodiments of the present disclosure have been described only for illustrative purposes, and those skilled in the art will appreciate that various modifications and changes may be made thereto without departing from the scope and spirit of the disclosure. The scope of the present disclosure shall be construed on the basis of the accompanying claims in such a manner that all of the technical ideas included within the scope equivalent to the claims belong to the present disclosure.

What is claimed is:

1. A vehicle control system comprising:
   at least one radar sensor mounted to a host vehicle to have a sensing area for an outside of the host vehicle, the at least one radar sensor configured to capture and process sensing data; and
   a controller configured to:
   select a target vehicle based on object information obtained from a result of processing the sensing data,
   generate a first driving route of the host vehicle based on road information about a road on which the host vehicle runs, obtained from the result of processing the sensing data,
   generate a second driving route obtained by correcting the first driving route based on road structure information comprised in the road information,
   based on the selected target vehicle and the second driving route, determine a lateral offset which is a lateral difference between the selected target vehicle and the second driving route,
   select the target vehicle as an ultimate target vehicle based on the lateral offset, and
   control the host vehicle to follow the ultimate target vehicle in the second driving route of the host vehicle based on the processed sensing data,
   wherein if a road structure is detected, the controller determines a lateral width between the road structure and the first driving route and generates the second driving route, and the controller generates the second driving route by adding a width route with respect to the lateral width and the first driving route.

2. The vehicle control system of claim 1, wherein the controller outputs a control signal to control a traveling speed of the host vehicle so that the host vehicle follows the ultimate target vehicle and maintains a constant distance from the ultimate target vehicle while running on the second driving route.

3. The vehicle control system of claim 1, wherein the controller selects, as the target vehicle, an object within the first driving route from among objects located ahead of the host vehicle.

4. The vehicle control system of claim 1, wherein the controller determines the lateral offset by additionally determining relative location information about the target vehicle with respect to the second driving route.

5. The vehicle control system of claim 1, wherein, if the lateral offset is less than or equal to a threshold value, the controller selects the target vehicle as the ultimate target vehicle, and
   wherein, if the lateral offset exceeds the threshold value, the controller does not select the target vehicle.

6. The vehicle control system of claim 1, wherein the road information comprises at least one of lane information, curvature information, or the road structure information, and
   the object information comprises at least one of location information, speed information, or appearance information about an object.

7. A control apparatus of an adaptive cruise control system, the control apparatus comprising:
   an information collector configured to collect at least one of driving information about a host vehicle, information about an object positioned ahead of the host vehicle, or information about a road on which the host vehicle runs;
   a target selector configured to select a target vehicle based on the information about the object and to select a first driving route of the host vehicle based on the information about the road;
   a route corrector configured to generate a second driving route obtained by correcting the first driving route based on road structure information among the information about the road;
   an offset determinator configured to determine a lateral offset, which is a lateral difference between the selected target vehicle and the second driving route, based on the second driving route and object information about the target vehicle; and a target corrector configured to select the target vehicle as an ultimate target vehicle based on the lateral offset, wherein if a road structure is detected, the route corrector determines a lateral width between the road structure and the first driving route and generates the second driving route, and the route corrector generates the second driving route by adding a width route with respect to the lateral width and the first driving route.

8. The control apparatus of claim 7, further comprising a signal outputter configured to output a control signal to control a traveling speed of the host vehicle so that the host vehicle follows the ultimate target vehicle and keeps a constant distance from the ultimate target vehicle while running on the second driving route.

9. A method for controlling an adaptive cruise control system, the method comprising:
   an information collection operation of collecting at least one of driving information about a host vehicle, information about an object positioned ahead of the host vehicle, or information about a road on which the host vehicle runs;
   a target selection operation of selecting a target vehicle based on the information about the object and selecting a first driving route of the host vehicle based on the information about the road;
   a route correction operation of generating a second driving route obtained by correcting the first driving route based on road structure information among the information about the road;
   an offset determination operation of determining a lateral offset, which is a lateral difference between the selected target vehicle and the second driving route, based on the second driving route and object information about the target vehicle;
   a target correction operation of selecting the target vehicle as an ultimate target vehicle based on the lateral offset; and
   a signal output operation of outputting a control signal to avoid the ultimate target vehicle while the host vehicle runs on the second driving route,
   wherein if a road structure is detected, the route correction operation determines a lateral width between the road structure and the first driving route and generates the second driving route, and the route correction operation generates the second driving route by adding a width route with respect to the lateral width and the first driving route.

10. The method of claim 9, wherein the target selection operation selects, as the target vehicle, an object within the first driving route from among objects located ahead of the host vehicle.

11. The method of claim 9, wherein the offset determination operation determines the lateral offset by additionally determining relative location information about the target vehicle with respect to the second driving route.

12. The method of claim 9, wherein, if the lateral offset is less than or equal to a threshold value, the target correction operation selects the target vehicle as the ultimate target vehicle, and if the lateral offset exceeds the threshold value, the target correction operation does not select the target vehicle.

\* \* \* \* \*